United States Patent [19]

Passarella

[11] 4,317,154

[45] Feb. 23, 1982

[54] COMMUNICATION CIRCUIT PROTECTOR

[76] Inventor: Thomas M. Passarella, Rte. 1, Box 357, Florence, Ala. 35630

[21] Appl. No.: 151,187

[22] Filed: May 16, 1980

[51] Int. Cl.³ .............................................. H02H 1/00

[52] U.S. Cl. ...................................... 361/119; 361/399

[58] Field of Search ............... 179/1 PC, 98; 361/119, 361/124, 356, 357, 380, 395, 399, 428

[56] References Cited

U.S. PATENT DOCUMENTS

| | | | |
|---|---|---|---|
| 3,310,712 | 3/1967 | Paddock | 361/357 |
| 3,895,267 | 7/1975 | Gordon | 361/399 |
| 3,904,812 | 9/1975 | Daffron | 361/395 |
| 4,009,421 | 2/1977 | Splitt | 361/119 |
| 4,146,755 | 3/1979 | Causse | 361/119 |
| 4,191,985 | 3/1980 | Phillips, Jr. | 371/119 |

*Primary Examiner*—Gerald P. Tolin
*Attorney, Agent, or Firm*—Harrington A. Lackey

[57] ABSTRACT

A quick-disconnect connector assembly for a communication circuit protector device having at least one over-voltage protector unit including first and second power electrodes and a ground electrode, comprising a printed circuit board upon which the over-voltage protector units are mounted, a jack mounted on the circuit board having a contact for each power electrode, and printed circuit leads electrically connecting each contact with each power electrode, whereby an electrical output telephone cord having a plug corresponding to the jack is adapted to be received in electrical communication with the jack.

3 Claims, 7 Drawing Figures

COMMUNICATION CIRCUIT PROTECTORBACKGROUND OF THE INVENTION

This invention relates to communication circuit protectors, and more particularly to a quick-disconnect circuit protector.

Communication circuit protectors, such as those disclosed in the Paddock U.S. Pat. No. 3,310,712, issued Mar. 21, 1967, are well known in the art for the protection of telephone circuits in houses and other buildings from various electrical overload conditions, such as lightning and crossed wires. These protector devices include over-voltage protector units of various types, such as gas tubes in which the gas is ionized by a surge of electricity to ground the communication lines in order to prevent destruction of the electrical lines and associated equipment.

Such protector devices are more or less permanently mounted on the side of the building. Each input and output communication line is connected to a threaded electrical terminal post and held in place by a threaded nut. Thus, if such protector device becomes damaged, or needs to be replaced for any reason, the nuts must be unthreaded, and the wires unbent or unwrapped and disconnected and the protector device discarded and replaced by a new protector device. Moreover, the input communication lines connected to the protector device must be installed in the building or house and connected to special connectors mounted in the house, all of which operations must be conducted by professionally-trained communication workers.

SUMMARY OF THE INVENTION

It is therefore an object of this invention to provide a quick-disconnect connector assembly in a telephone communication circuit protector which may be easily replaced or repaired as needed and in which the input line to the telephone set may be easily and quickly connected and disconnected to the protector device, even by unskilled labor, including the homeowner.

The quick-disconnect connector assembly made in accordance with this invention includes a printed circuit board upon which are mounted conventional over-voltage protector units having power electrodes and a ground electrode. The respective input power leads from the drop line are connected to the respective power electrodes. A quick-disconnect jack is mounted on the printed circuit board and has as many contacts as there are power electrodes. Each contact is connected to its corresponding power electrode by a corresponding printed circuit lead on the circuit board. A ground line is also connected to the ground electrode of each protector unit. The overload protector device is then mounted on the outside of the building in a conventional manner.

A special output telephone line or lead having a quick-disconnect plug at each of its opposite ends is employed to connect the telephone set directly to the overload protector device. One plug corresponding to the jack is easily received in electrical communication with the jack, and just as easily removed, while the opposite plug corresponds to the receptacle or jack within the telephone or, where multiple telephones are employed, into a splitter device mounted within the house. Where multiple telephones are used, then separate individual cords having quick-disconnect plugs at each end connect the respective telephone sets to the splitter, passing through corresponding holes in the floors or walls of respective rooms in which the telephone sets are located. Thus, one or more telephones may be easily installed and connected to the house protector device by the homeowner or by persons unskilled in communications equipment installation.

The protector device with the quick-disconnect connector assembly may be made as integral original equipment, or the protector may be made as an adaptor device for assembly with an existing conventional communication circuit overload protector.

DESCRIPTION OF THE PREFERRED EMBODIMENTS

Figure 1:
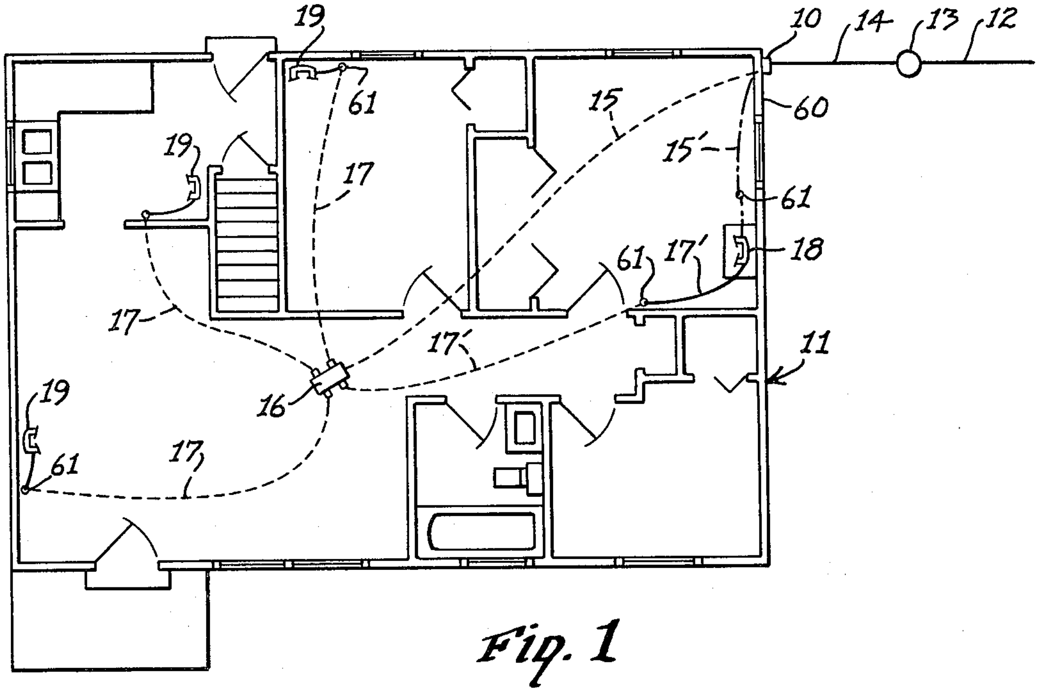
FIG. 1 is a schematic house layout diagram, illustrating the installation of a protector device made in accordance with this invention, in communication with multiple telephones.

Referring now to the drawings in more detail, FIG. 1 discloses a circuit protector device 10, made in accordance with this invention, mounted upon the outside wall of a or building house 11. The conventional overhead, or underground, telephone or communications line 12 is carried by a telephone pole 13, from which an input drop line 14 is connected to the protector device 10. The protector device 10 is connected to a detachable communication or output telephone cord or line 15 installed in the house 11, preferably beneath the floor, and connected to a splitter device 16. Branch telephone lines 17 and 17' are connected at one end to the splitter 16 and at their opposite ends to the respective telephones 18 and 19 in various rooms of the house.

Figure 3:
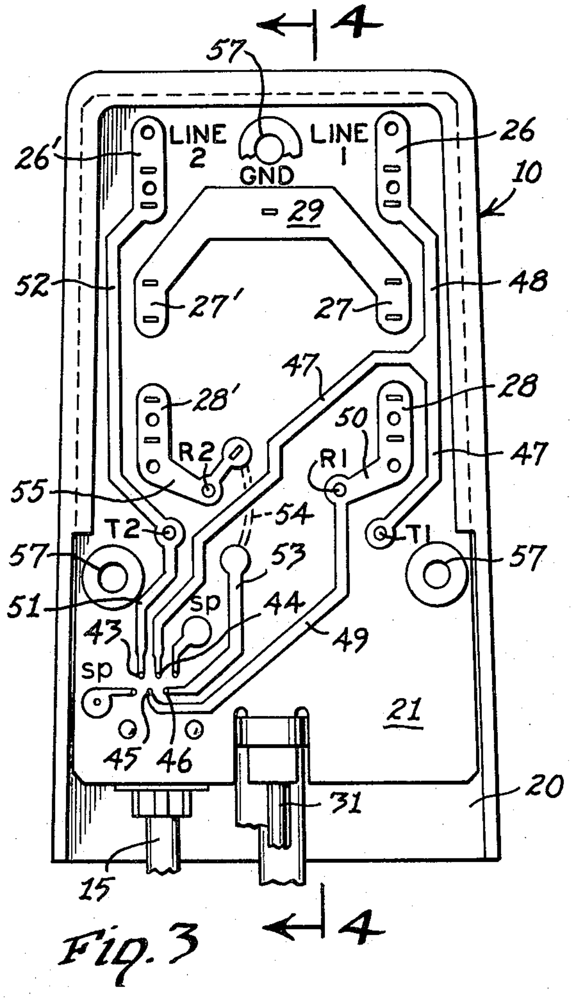
FIG. 3 is a rear view of the device disclosed in FIG. 2, with the fragmentary output telephone line connected, and taken along the line 3—3 of FIG. 4.
Figure 2:
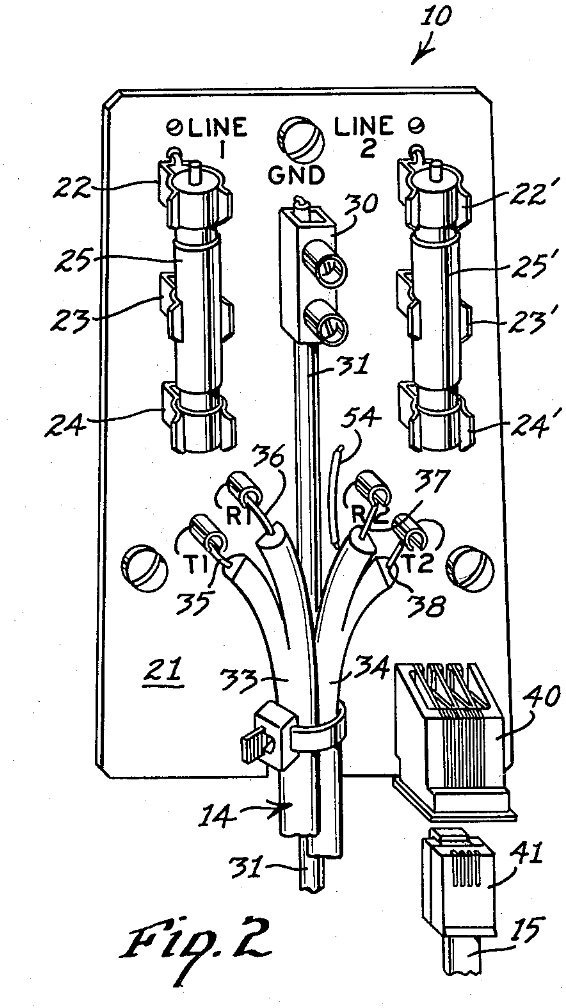
FIG. 2 is a front perspective view of one form of the protector device made in accordance with this invention, with the power line input and ground lines shown fragmentarily and the output telephone line shown fragmentarily and disconnected.
Figure 4:
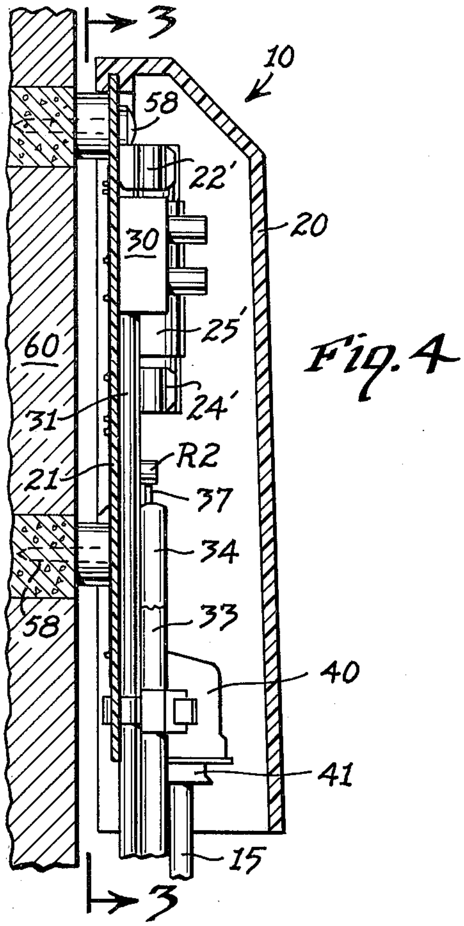
FIG. 4 is a fragmentary section taken along the line 4—4 of FIG. 3.

The protector device 10 is disclosed in more detail in FIGS. 2, 3 and 4, and includes a protective cover 20. Within the cover 20 is a substantially rectangular printed circuit board 21 upon which are mounted a series of aligned conductor clips 22, 23, and 24 within which is seated in electrical and mechanical engagement an over-voltage protector unit in the form of a gas tube 25. The upper clip 22 is in electrical communication with an upper power electrode 26 of line 1 on the back surface of the printed circuit board 21, while the ground electrode 27 is in communication with the clip 23, and the lower power electrode 28 is in electrical communication with the clip 24.

On the opposite side of the printed circuit board from the gas tube 25 is another identical gas tube 25' supported in clips 22', 23' and 24', also in electrical communication with their respective electrodes 26', 27', and 28' for line 2, if such a line is desired or needed. The elements for line 2 are identical to the corresponding elements in line 1.

The ground electrodes 27 and 27' are connected to each other through a common printed circuit lead 29, which in turn is connected to a ground connector 30 connected to one end of a ground line 31. The ground line 31 is grounded externally to a ground point, not shown.

The drop line 14 includes input lines 33 and 34. Input line 33 includes input leads 35 and 36 electrically and mechanically connected to the terminal posts T1 and R1, which extend through the printed circuit board 21. The input line 34 includes input lead 37 electrically and mechanically connected to the terminal post R2.

Mounted in fixed position on the lower portion of the face of the printed circuit board 21 is a jack 40 of conventional design which functions as a quick-disconnect for reception of a corresponding plug 41 terminating one end of an output lead 15.

Although the particular jack 40 disclosed in the drawings is provided with 6 contacts, nevertheless only the contacts 43, 44, 45 and 46 are utilized in the protector device 10. The remaining contacts identified SP (spare) are not utilized.

Terminal post T1 is connected to the jack contact 44 through printed lead 47, and to the upper electrode 26 through printed lead 48.

Terminal post R1 is connected to jack contact 45 through printed lead 49, and is connected to the lower electrode 28 through printed lead 50.

Terminal post T2 is connected to the jack contact 43 through lead 51 and to the upper electrode 26' through lead 52.

Terminal post R2 is connected to the jack contact 46 through lead 53 and jumper wire 54, and to the lower electrode 28' through the printed lead 55.

Mounting holes 57 are formed through the printed circuit board 21 for receiving fastener devices such as nails or screws 58 for securing the device 10 to the side wall 60 of the house 11 (FIG. 4).

The other end of the telephone output line 15 is provided with a plug identical to plug 41 for insertion into a corresponding receptacle within the splitter 16 for quick-disconnect electrical connection. In a similar manner, each of the telephone branch lines 17 and 17' is provided at its opposite end with a plug identical to plug 41 for reception into corresponding receptacles within the splitter 16 and within the corresponding telephones 18 and 19.

In a house 11, where only one telephone 18 is incorporated, the output telephone line 15 may be connected directly to the telephone 18, as illustrated in its position 15' in FIG. 1, thereby eliminating the necessity of a splitter 16.

Because of the ease in connecting the plug 41 into the jack 40 of the protector device 10 and the other plug at the opposite end of the line 15 into the splitter 17 or the telephone 18, no wall connectors or floor connectors are required. The line 15 may be carried beneath the floor of the house and introduced into the particular room through corresponding hole 61 and led directly to the particular telephone 18 or 19 to which the lines are connected. Thus, each of the telephones 18 or 19 may be easily moved about in the room, and its movement limited only by the length of the particular cord 15', 17 or 17'.

Figure 7:
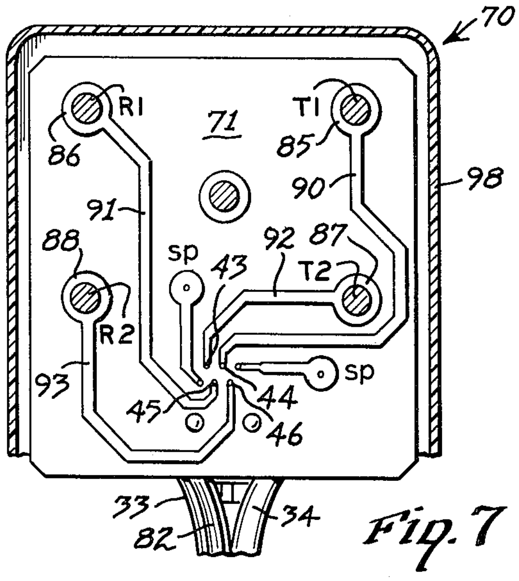
FIG. 7 is a section taken along the line 7—7 of FIG. 6.
Figure 5:
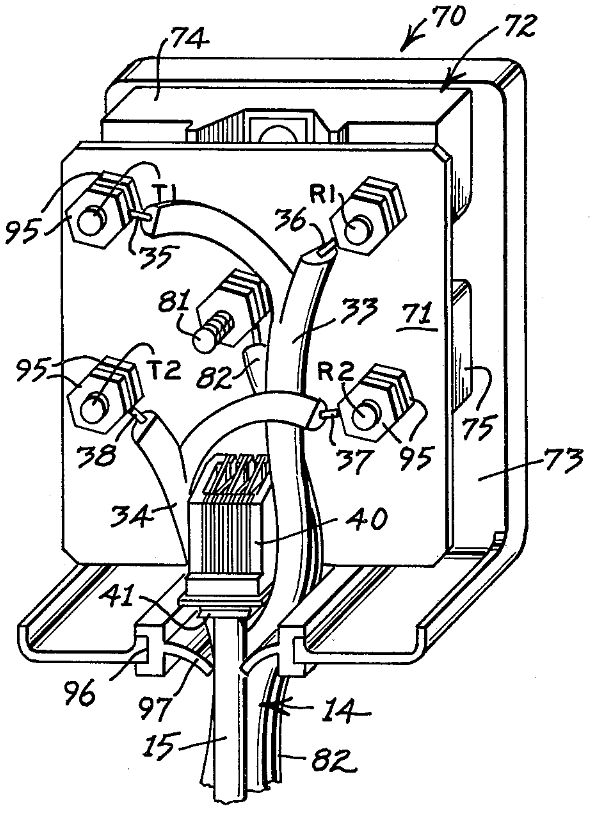
FIG. 5 is a front perspective view of a modified quick-disconnect connector assembly adapted for installation on a conventional overload protector device.
Figure 6:
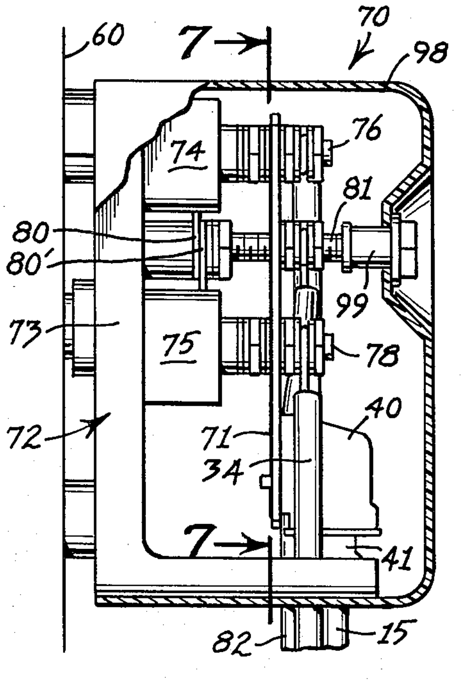
FIG. 6 is a side elevation of the device disclosed in FIG. 5, with the cover assembled and shown fragmentarily.

In the modified protector device 70 disclosed in FIGS. 5–7, a modified printed circuit board 71 is mounted upon an existing conventional circuit overload protector device 72, to provide the quick-disconnect connector capacity to the device 70. The conventional protector device 72 includes a chassis or body 73 to which is fixed a pair of identical over-voltage protector units 74 and 75, each having respective power electrodes T1, R1, T2 and R2, connector ground plates 80 and 80', and threaded ground stud 81. Ground line 82 is electrically connected to the ground stud 81.

As in the protector device 10, the drop line 14 is divided into two input cords or lines 33 and 34, and the leads 35, 36, 37, and 38 are electrically connected about the electrode studs or terminal posts T1, R1, R2 and T2, respectively, the connections being the same as those in the power device 10 illustrated in FIG. 2. In the device 70, the power electrodes for the protector units 74 and 75 are identical, and coincide with the respective power terminals T1, R1, T2, and R2.

Mounted on the lower portion of the printed circuit board 71 is the quick-disconnect modular jack 40 which is adapted to receive in electrical communication the plug 41 at one end of the output telephone cord 15.

The same electrical contacts 43, 44, 45, and 46 of the jack 40, as well as the two spare contacts SP appear on the rear face of the circuit board 71 in FIG. 7, and in the same arrangement as the identical contacts on the back face of the printed circuit board 21 in FIG. 3.

However, in order to mount the circuit board 71 in operative relationship with the over-voltage protector units 74 and 75, stud holes are formed in the circuit board 71 to fit over and receive the respective terminal posts T1, R1, T2 and R2, respectively, as best disclosed in FIG. 7. Surrounding each hole is a circular or annular printed contact ring 85, 86, 87, and 88.

A printed circuit lead 90 on the back of the circuit board 71 electrically connects the contact 44 with the electrode post T1 through the contact ring 85. The printed lead 91 electrically connects the contact 45 with the electrode post R1 through contact ring 86. The printed lead 92 electrically connects the contact 43 with the post T2 through contact ring 87, while the printed lead 93 connects the contact 46 with the circular contact ring 88 electrically engaging the post R2.

Both the printed circuit board 71 and the input leads 35, 36, 37 and 38 are secured to the respective electrode posts T1, R1, T2, and R2, by nuts 95 secured to the respective externally threaded electrode posts.

The drop line 14, the output telephone cord 15, and the ground line 82 may all pass through the same bottom opening 96 lined by the slit grommet 97 in the chassis 73 as best disclosed in FIG. 5.

A cover 98 is fitted over the chassis 73 and secured to the threaded ground post 81 by the internally threaded fastener member 99. The chassis 73 upon which the protector units 74 and 75 are mounted, and the printed circuit board 71 along with all of the electrical wiring and cover 98 may be secured upon the side wall 60 of the house 11 by any convenient securing means, not shown.

The installation of the wiring disclosed in FIG. 1 for connection to the protector device 10 may be identical for connection to the protector device 70.

Furthermore, the protector devices 10 and 70 function in substantially the same way. Normally the electrical power and telephone signals are transmitted over the line 12, through the drop wire 14 and thence through the respective connectors within the protective devices 10 or 70 to the jack 40, and thence through the plug 41 and output telephone line 15 to the respective telephones 18 and 19.

However, when the telephone communication lines are overloaded or receive an exceptional surge of power, such as from lightning or short circuiting, such as by crossed wires in a heavy windstorm, the excessive voltage will render the respective overvoltage protector units 25 or 25', or 74 or 75, conductive to immediately discharge the excessive electrical load to ground, through the respective ground lines 31 or 82, thus preventing damage to any of the components of the circuitry and equipment protected by the respective protector devices 10 and 70.

However, the quick-disconnect connectors 40 and 41 as mounted on their respective printed circuit boards 21 and 71 of the protector devices, are not only simple to install, but also simple to connect to the house telephone lines and the respective telephones. Moreover, such quick-disconnect assemblies for the respective protector devices 10 and 70 render such devices easily removable and replacable.

Furthermore, the printed circuit board 71 supporting the jack 40 may easily be installed upon an existing and conventional overload protective device 72 with a minimum of expense and effort.

A protector device such as 10 is much lighter, simpler and more economical to fabricate than most conventional overload protector devices.

Although in the protector device 70 in FIGS. 5–7, the input lines 33 and 34 are disclosed in front of the circuit board 71, nevertheless in the preferred assembly, the input lines 33 and 34 would be behind the printed circuit board 71 with the leads 35, 36, 37 and 38 connected to the same respective posts T1, R1, R2 and T2 behind the circuit board 71. The ground line 82 would also be connected to the post 81 behind the board 71. Electrically, all the connections would be the same, whether in front or behind the printed circuit board 71.

What is claimed is:

1. A telephone circuit overload protector device adapted to be mounted upon the wall of a building containing a telephone set, comprising:

(a) a circuit board, (b) an over-voltage protector unit including first and second power electrodes and a ground electrode, (c) means mounting said over-voltage protector unit on said circuit board, (d) first and second electrical telephone input leads electrically connected respectively to said first and second power electrodes, (e) a ground lead electrically connected to said ground electrode, (f) a jack having first and second contacts mounted on said circuit board, (g) a first lead on said circuit board electrically connecting said first contact and said first power electrode, (h) a second lead on said circuit board electrically connecting said second contact and said second power electrode, (i) said jack being adapted to receive in electrical communication a corresponding connector plug, (j) an electrical telephone cord having first and second ends, said first end terminating in a quick-disconnect connector plug detachably receivable within said jack and in electrical communication with said first and second contacts, and (k) means connecting said second end of said telephone cord to a telephone set contained within the building.

2. The invention according to claim 1 in which said circuit board comprises a printed circuit board and each of said first and second leads is printed on said board.

3. The invention according to claim 1 in which said quick-disconnect connector plug is a first quick-disconnect connector plug, and said means connecting said second end of said telephone cord to a telephone set comprises a second quick-disconnect connector plug receivable in electrical cummunication within a corresponding receptacle in said telephone set.

* * * * *